Figure 3:
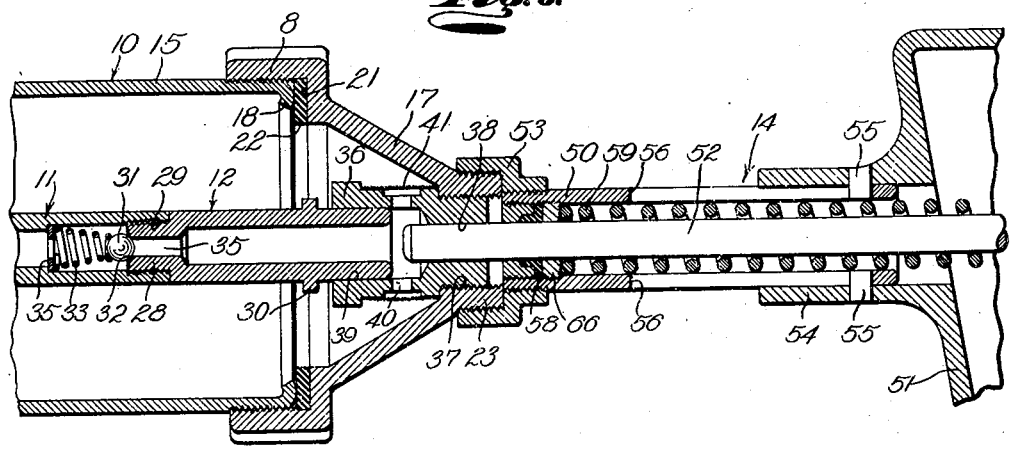

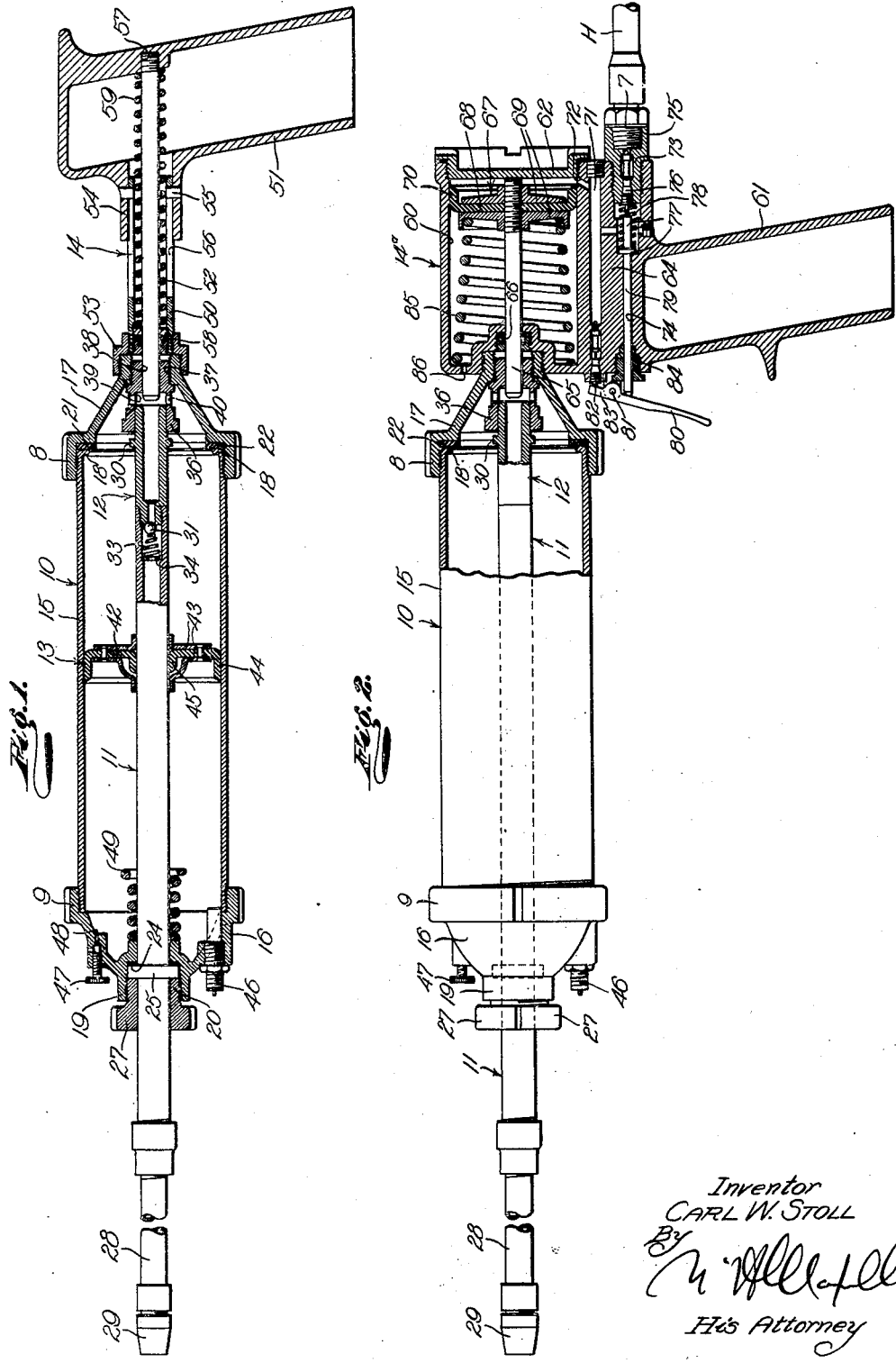

April 19, 1938.  C. W. STOLL  2,114,509
GREASE GUN
Filed May 26, 1936  3 Sheets-Sheet 2

Inventor
CARL W. STOLL
By
His Attorney

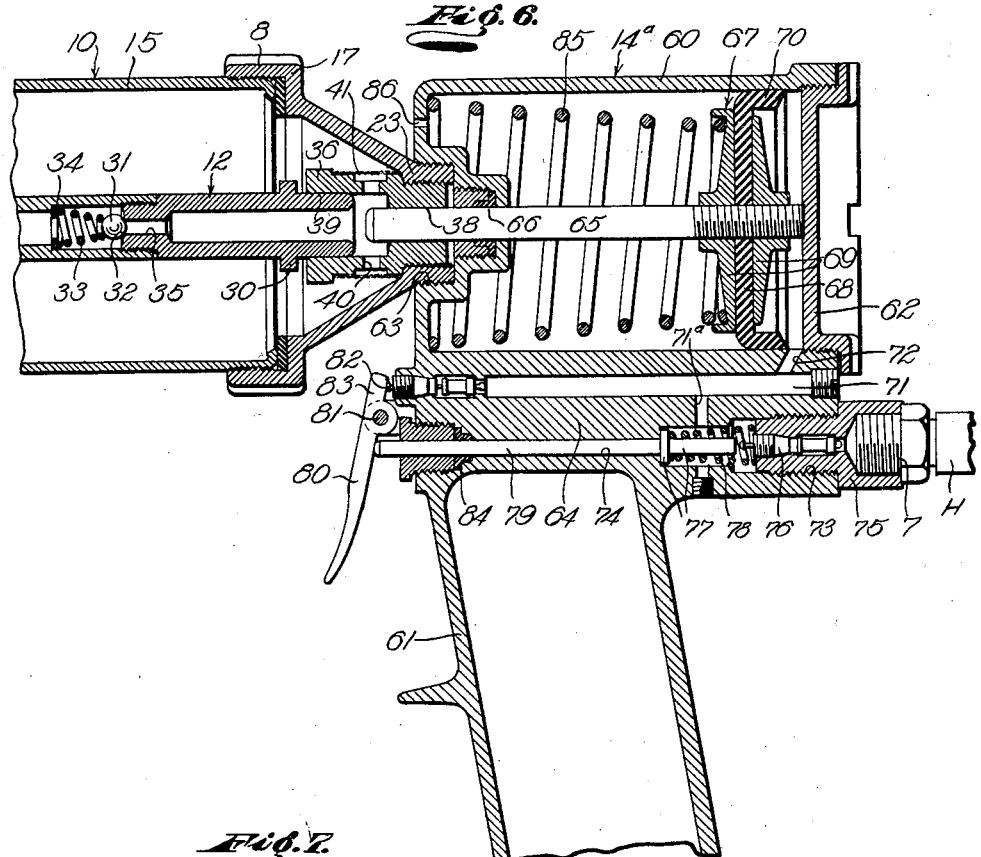
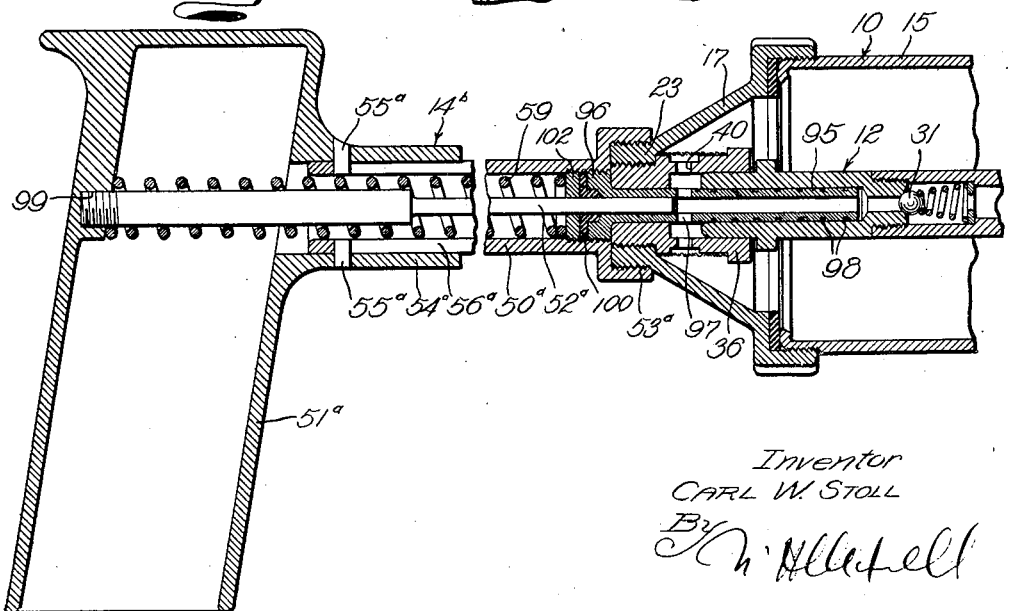

Patented Apr. 19, 1938

2,114,509

UNITED STATES PATENT OFFICE 2,114,509

GREASE GUN

Carl W. Stoll, Los Angeles, Calif., assignor to Smith-Johnson Corporation, Los Angeles, Calif., a corporation of California Application May 26, 1936, Serial No. 81,846

23 Claims. (Cl. 221—47.4)

This invention relates to lubricant handling apparatus and relates more particularly to portable grease guns. A general object of this invention is to provide a compact, practical and effective grease gun that may be readily and quickly conditioned for the manual ejection of the lubricant or the power ejection of the lubricant.

Another object of this invention is to provide a convertible grease gun embodying a lubricant container assembly having a discharge tube for delivering the lubricant to the parts to be lubricated, a high pressure lubricant cylinder and means for feeding lubricant from the container to the cylinder, which assembly is adapted to receive a handle and ram unit for the ejection of the lubricant from the cylinder under the pressure of a manual thrust on the device, and is also adapted to receive a power operated ram unit embodying a ram operable in said cylinder by a suitable fluid under pressure to eject the lubricant to the ports to be lubricated. The single container, discharge tube, and cylinder assembly of the present invention may be easily adapted for the handling of lubricants of various grades or types and for the lubrication of various machine parts by merely interchanging the manually actuated ram unit and the power operated ram unit.

Another object of this invention is to provide a convertible grease gun of the character mentioned in which the manually operated ram unit and the fluid pressure actuated ram unit may be easily and quickly exchanged without disturbing or removing any parts of the container, discharge tube and cylinder assembly and, if desired, without changing the grade or type of lubricant in the container.

Another object of this invention is to provide a self-contained grease gun characterized by a lubricant container and ejector cylinder assembly that is adapted to receive either a high pressure manually actuated ram unit or a low pressure manually actuated ram unit for effecting the ejection of the lubricant under pressure. The lubricant container, discharge tube, and cylinder assembly may be quickly conditioned for use with the high or low pressure manually operated ram units without the removal or alteration of any parts.

Another object of this invention is to provide a portable self-contained grease gun in which the principal mass of the lubricant and the ejecting mechanism are adjacent the rear or inner end of the gun where the gun is supported and held by the operator, thus promoting the easy convenient manipulation of the gun.

Another object of this invention is to provide a convertible manually actuated and power actuated grease gun of the character mentioned that embodies a spring loaded or spring urged follower for feeding the lubricant to the container.

Another object of this invention is to provide a lubricant container assembly for a convertible grease gun of the character mentioned that embodies a spring actuated follower for feeding lubricant to the ejector cylinder that is such that the spring for motivating the follower is withdrawn through the forward end of the container when loading or drawing a supply of lubricant into the container by means of the follower.

Another object of this invention is to provide a convertible manually actuated and power actuated grease gun of the character mentioned characterized by a lubricant container embodying a fluid pressure actuated follower for feeding lubricant to the ejector cylinder, which follower operates on or over a normally stationary discharge tube which does not require packing between normally relatively movable parts to prevent the loss of charging fluid pressure at the forward end of the gun.

Another object of this invention is to provide a convertible grease gun of the character mentioned embodying a novel ported centering part or unit that admits the lubricant to the ejector cylinder and that receives and properly centers the rams of the exchangeable power actuated ram unit and the manually actuated ram unit.

Another object of this invention is to provide a compact and particularly effective handle and manually operable ram unit for a convertible grease gun of the character mentioned.

Another object of this invention is to provide a simple, compact and efficient manually controlled power actuated ram unit for a convertible grease gun of the character mentioned.

A further object of this invention is to provide a portable self-contained grease gun in which practically the entire shell or body of the gun may be utilized to store or contain lubricant.

Figure 4:
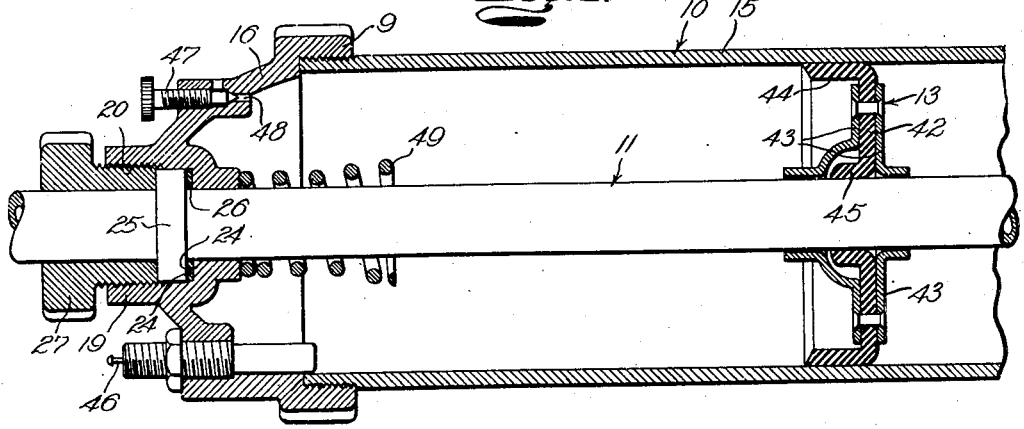
Figure 5:
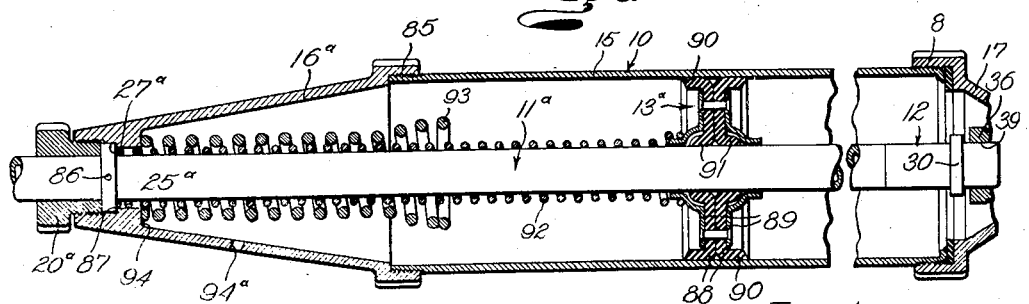

The various other objects and features of my invention will be fully understood from the following detailed description of typical preferred forms and applications of the invention, throughout which description reference is made to the accompanying drawings, in which:

Fig. 1 is a central longitudinal detailed sectional view of the combination of the pneumatically primed container assembly and the manually operable low pressure ram unit. Fig. 2 is a side elevation of the container assembly illustrated in Fig. 1 showing the power actuated ram unit in conjunction therewith, the ram unit and the adjacent part of the container being in central vertical cross section. Fig. 3 is an enlarged fragmentary vertical detailed sectional view of the manually operable low pressure ram unit. Fig. 4 is an enlarged fragmentary vertical sectional view of the pneumatically primed container assembly. Fig. 5 is a central longitudinal detailed sectional view of the spring loaded container assembly. Fig. 6 is an enlarged fragmentary vertical detailed sectional view of the power operated ram unit and Fig. 7 is a vertical detailed sectional view of the high pressure manualy operable ram unit applied to a container assembly.

The present invention is directed to a grease gun that may be converted from a low pressure or a high pressure hand operated device to a power actuated device at the will of the operator, whereby it may handle various lubricants and may be employed in the lubrication of machine parts and bearings of different types. In the following detailed disclosure I will describe several typical embodiments of the invention, it being understood that the invention is not to be construed as limited or restricted to the specific details set forth, but that it is to be taken as including any features or modifications that may fall within the scope of the claims.

The form of the invention and the combination of parts illustrated in Figs. 1 and 3 of the drawings comprises, generally, a lubricant container 10 having a discharge tube 11, an ejector cylinder 12 associated with the tube 11, a fluid pressure actuated follower 13 in the container 10 for feeding lubricant to the cylinder 12, and a manually operable ram unit 14 removably connected with the container 10 and operable to force charges of lubricant from the cylinder 12 through the discharge tube 11.

The container 10 comprises the main part or body of the gun and is adapted to carry and store a supply of lubricant and to support the tube 11, the cylinder 12, etc. In the preferred construction the container 10 is in the nature of an elongate substantially cylindrical assembly proportioned to be conveniently handled by the operator. In practice the container 10 may comprise a main tubular section 15, a forward head or cap 16, and a rear head or cap 17. The section 15 may be in the form of an elongate cylindrical tube having its opposite end portions threaded for the reception of the caps 16 and 17. In accordance with the invention an annular inwardly curled lip 18 is provided on the section 15 at its rear end. The forward cap 16 closes the forward end of the section 15 and forms a support for the tube 11. The cap 16 may have an annular flange 9 threaded to the forward end of the section 15. A central boss 19 is provided on the cap 16. The cap 17 is preferably removably secured to the section 15 so that it may be easily removed to give access to the interior of the container, to permit loading of lubricant in the container, etc. The cap 17 may have an annular flange 8 threaded on the rear end of the section 15. A forwardly facing internal shoulder 21 is provided on the interior of the cap 17 and a sealing gasket 22 is clamped between the shoulder 21 and the lip 18 to provide a seal between the cap and the section 15. The rear cap 17 may be tapered rearwardly to a reduced central boss 23.

The discharge tube 11 is provided to conduct the ejected lubricant under pressure to the parts to be lubricated or to a fitting or conduit for conveying the lubricant to the machine parts. The tube 11 enters the forward end of the container 10 and extends rearwardly through the container to a point adjacent its rear end. The tube 11 extends through an opening 20 in the boss 19 and is preferably co-axial with the container section 15. During the operation of the grease gun the discharge tube 11 is relatively stationary and is secured or fixed to the cap 16. A forwardly facing shoulder 24 is provided on the boss 19 and a flange or collar 25 is fixed to the tube 11 and bears rearwardly against the shoulder 24. A sealing gasket 26 may be interposed between the shoulder 24 and the collar 25. In the particular construction illustrated the collar 25 is brazed or welded to the rod 11. A nut 27 is removably threaded in the opening 20 in the boss 19 to clamp the collar 25 rearwardly against the gasket 26 and thus hold the tube 11 against movement. The nut 27 may be unthreaded from the boss 19 to permit longitudinal movement of the tube 11 for the purpose of drawing lubricant into the container 10 as will be subsequently described. A conduit or extension 28 may be secured to the outer end of the tube 11 and may be provided with a discharge fitting 29 for cooperating with the lubricant receiving fittings on the bearings or parts to be lubricated. It will be noted that the normally stationary tube 11 may be a simple member of uniform external diameter.

The high pressure cylinder or ejector cylinder 12 is connected with the rear end of the discharge tube 11. In practice the cylinder 12 may be an integral tubular part. The cylinder 12 is preferably axially aligned with the discharge tube 11 and may be secured to the tube in any suitable manner. In the case illustrated, a reduced pin 28 is provided on the forward end of the cylinder 12 and is threaded into a central socket 29 in the rear end of the tube 11. The cylinder 12 is thus axially aligned with the tube 11. The cylinder 12 may project into the tapered cap 17 and its rear end is open to receive the ram of the unit 14. A stop shoulder 30 is provided on the exterior of the cylinder 12 to limit the rearward travel of the follower 13.

An outlet valve is provided at the forward end of the cylinder 12. The outlet valve may comprise a ball 31 urged against a seat 32 by a spring 33. The seat 32 may be formed directly on the forward end of the cylinder pin 28 and the spring 33 may be arranged under compression between the valve 31 and a suitable stop ring 34 in the tube 11. It is preferred that a port 35 of reduced diameter extend from the interior of the cylinder 12 to the seat 32 to be under the control of the valve 31.

The invention provides a novel fitting or guide 36 at the rear end of the cylinder 12 for admitting lubricant to the cylinder and for guiding and locating the ram of the ram unit for operation in the cylinder. The guide 36 may be carried by the cap 17 to engage about the rear end of the cylinder 12. In practice the guide 36 may have its rear portion threaded into a central opening 37 in the boss 23. A longitudinal opening 38 is provided in the guide 36 and is longitudinally aligned with the opening of the cylinder 12. A socket 39 is provided in the forward end of the guide 36 and receives the rear portion of the cylinder 12. A plurality of lateral parts 40 is provided in the wall of the guide 36 to deliver lubricant from the container 10 to the rear end of the cylinder 12. Strainers or screens 41 are arranged across the outer ends of the ports 40 to prevent the admission of foreign matter to the cylinder 12.

The form of container assembly being described is fluid pressure primed or actuated to feed lubricant to the cylinder 12 and embodies the piston or follower 13 operable in the container 10. The follower 13 surrounds the discharge tube 11 and is operable rearwardly in the container 10 against the mass of lubricant in the container. The follower 13 may comprise a single packing member 42 clamped between two plates 43. A lip or flange 44 is provided on the periphery of the packing member 42 to slidably seal with the internal wall of the container section 15. A forwardly projecting flange 45 may be provided on the packing member 42 to slidably seal with the discharge tube 11. The forward plate 43 may be bent or formed to permit the proper operation of the sealing flange 45.

Means is provided to admit air or other fluid under pressure to the forward end of the container 10 to act against the follower 13. In practice a suitable air admitting check valve 46 may be provided in the cap 16 to admit air under pressure to the container 10 from an air hose such as found in service stations, garages, etc. It is preferred to provide a relief valve 47 on the cap 16 to permit the discharge of the fluid under pressure from the container 10 when it is desired to reload the container or exchange the actuating ram units. The relief valve 47 may be in the nature of a simple needle manual valve controlling a port 48 in the wall of the cap 16. It will be apparent how fluid under pressure in the forward portion of the container 10 presses the follower 13 rearwardly against the body of lubricant to feed the lubricant into the cylinder 12 through the ports 40. The flange 30 on the cylinder 12 is operable to limit the rearward travel of the follower 13.

The tube 11 and the follower 13 may be conveniently employed to load or charge the container 10 with lubricant. To charge the container 10 with lubricant the valve 47 is first opened to relieve pressure at the rear of the follower 13 and the nut 27 is unthreaded from the boss 19 to permit forward movement of the tube 11. The cap 17 is unthreaded from the container section 15 and the open rear end of the container section 15 is inserted in a supply of the desired lubricant. The tube 11 is then pulled outwardly or forwardly relative to the container 10 and the shoulder 30 cooperates with the follower 13 to move the follower with the tube. As the tube 11 is pulled outwardly the follower 13 sucks or draws the charge of lubricant into the rear end of the section 15.

The invention provides a novel stop for limiting the forward charging movement of the follower 13. A coiled spring 49 surrounds the tube 11 and is secured to or bears on the cap 16. When the follower 13 approaches the end of its forward lubricant charging stroke the forward plate 43 engages the spring 49. The spring 49 yieldingly limits the forward movement of the follower 13 and operates to stop the follower in a position where a suitable space is left in the forward portion of the container 10 to receive the air under pressure for acting against the follower. The spring 49 also yields to permit further forward movement of the follower 13 when the tube 11 is pushed back into the container 10 after the cap 17 has been again secured to the rear end of the container. It is to be noted that the tube 11 is normally fixed or stationary with respect to the container 10 and is sealed about by the simple gasket 26 so that there is no necessity for a sealing means for packing about any reciprocating parts at the forward end of the gun to prevent the loss of air pressure.

The air primed or fluid pressure primed container assembly just described is adapted to receive the manually actuated ram unit 14, the fluid pressure actuated ram unit 14ª illustrated in Figs. 2 and 6 or the high pressure manually actuated ram unit 14ᵇ illustrated in Fig. 7. The ram units 14 and 14ᵇ illustrated in Figs. 1 and 7 are in the nature of manually operable means for ejecting charges of lubricant from the cylinder 12 while the ram unit 14ª illustrated in Figs. 2 and 6 is in the nature of a power actuated or pneumatically actuated ram unit. In accordance with the invention the units 14, 14ª and 14ᵇ may be interchangeably employed on the container assembly described above or on the spring loaded container assembly illustrated in Fig. 5 of the drawings.

The manually operable ram unit 14 in addition to forming an ejecting means constitutes a handle means for facilitating the manipulation of the gun. The unit 14 includes a guide tube 50 removably secured to the cap 17, a handle 51 reciprocable on the tube 50 and a ram 52 movable with the handle 51 and operable in the cylinder 12. The tube 50 of the unit 14 is provided at its forward end with means for detachably connecting with the cap 17 of the container 10. In practice a socket member 53 is provided on the forward end of the tube 50 and is threaded on the boss 23 to removably secure the unit 14 to the container 10. The socket member 53 may be threaded on the tube 50 and then welded to the tube to be rigid therewith.

The handle 51 may have the configuration of a pistol grip to be conveniently grasped. The handle 51 is normally at the outer end of the tube 50 and is shiftable or reciprocable on the tube to operate the ram 52. A tubular boss 54 on the forward side of the handle 51 shiftably receives the tube 50. Pins 55 project inwardly from the boss 54 and operate in slots 56 in the guide tube 50 to prevent turning of the handle on the tube and to limit the movement of the handle. The operating handle 51 may be hollow to be inexpensive and light in weight.

The plunger or ram 52 of the unit 14 is secured to the handle 51 to move therewith. The ram 52 is an elongate rod-like member extending through the guide tube 50 with suitable clearance to project into the guide 36 and operate in the cylinder 12. The rear portion of the ram 52 may be threaded into a socket 57 in the rear wall of the handle 51 to secure the ram to the handle. The ram 52 extends through a suitable packing gland 58 in the forward end of the guide tube 50. The gland 58 has an inner part 58ª threaded in the tube 50 to maintain the packing of the gland under compression. The ram 52 is sufficiently long to at all times extend into or through the guide 36. Upon forward movement of the handle 51 relative to the container 10 the ram 52 moves forwardly into and through the cylinder 12 to displace a charge of lubricant therefrom into the discharge tube 11. Means is provided for returning the handle 51 and the ram 52 to their normal positions after actuation of the ram. A spring 59 surrounds the ram 52 and is arranged under compression between the packing part 58ª and the rear wall of the handle 51. The spring 59 operates to normally hold the handle 51 and the ram 52 in their rear positions and to return them to their normal rear positions after each actuation of the ram.

If it is desired to employ the grease gun to force charges of lubricant under pressure to parts to be lubricated by means of the relatively low pressure manual ram unit 14, the unit 14 may be assembled on the container 10 as illustrated in Fig. 1 of the drawings. The container 10 may have been previously filled or charged with a suitable lubricant by means of the discharge tube 11 and follower 13 in the manner described above. It may be desired or found necessary to provide air or suitable fluid under pressure in the forward portion of the container 10 to feed lubricant from the container into the cylinder 12.

To actuate the gun the fitting 29 is arranged against the grease receiving fitting which is to receive the charges of lubricant and a thrust or pressure is applied to the handle 51 to effect forward movement of the ram 52 relative to the container 10 so that the ram enters and moves forwardly in the cylinder 12 to displace or force a charge of lubricant from the cylinder into the tube 11. At the completion of the forward movement of the handle 51 the operator while holding the container 10 stationary, with the fitting 29 against the grease receiving fitting, allows the handle 51 to move rearwardly under the action of the spring 59. Rearward movement of the handle 51 and the ram 52 to their rear positions evacuates the cylinder 12 and allows a charge of lubricant to be forced into the rear end of the cylinder 12 through the ports 49. The follower 13 pressing against the forward end of the body of grease in the container 10 aids in feeding the lubricant to the cylinder 12. The above operation may be repeated to successively force charges of lubricant under pressure into and through the tube 11 to the grease receiving fitting.

As there are no normally moving or reciprocating parts at the forward end of the container 10 there is little danger of the leakage of charging fluid pressure from the forward portion of the container. The ram 52 may be easily and conveniently operated through the medium of the handle 51. The guide 36 centers and guides the ram 52 for proper operation in the cylinder 12. The follower 13 automatically moves rearwardly against the body of lubricant in the container 10 as the lubricant is ejected from the gun. It may be found necessary to provide air under pressure in the forward portion of the container 10 from time to time during the operation of the gun. The container 10 may be easily charged with a supply of lubricant by means of the tube 11 and the follower 13, as fully described above.

The power actuated ram unit 14ª illustrated in Figs. 2 and 6 of the drawings is adapted to be employed on the container assembly illustrated in Figs. 1 to 4 of the drawings, or on the container assembly illustrated in Fig. 5 of the drawings. The unit 14ª is a separable structure adapted to be removably connected with the rear caps of the container assemblies illustrated in the drawings. The unit 14ª comprises a body whose upper portion is chambered to form a cylinder 60 and whose lower portion is in the nature of a handle 61. The cylinder 60 is a substantially cylindrical part and is axially aligned with the container 10 when in position on the assembly as illustrated in Figs. 2 and 6 of the drawings and has an integral forward end wall. A threaded cap or plug 62 closes the rear end of the cylinder 60. A central socket 63 is provided in the forward end wall of the cylinder 60. When the unit 14ª is to be employed in connection with the container 10 as illustrated in Fig. 2 of the drawings the boss 23 is threaded into the socket 63 to removably secure the unit 14ª to the container assembly. The body is thickened or provided with a flange 64 where the cylinder 60 and handle 61 join. The handle 61 is preferably hollow to be light in weight and is preferably integral with the flange 64 and the cylinder 60.

The power actuated ram unit 14ª includes a plunger or ram 65 for operating in the cylinder 12 to eject the lubricant therefrom. The ram 65 may be a simple solid cylindrical member, as illustrated in the drawings. The ram 65 extends longitudinally through the cylinder 60 and passes forwardly through a suitable packing gland 66 in the forward wall of the cylinder 60. The ram 65 is proportioned to at all times project from the cylinder 60 into the guide 36. The guide 36 operates to slidably support and guide the ram 65 and to properly align the ram with the cylinder 12. In accordance with the invention a piston 67 is provided in the cylinder 60 to operate the ram 65. The piston 67 is preferably on or secured to the ram 65. The piston 67 may comprise a simple packing member 68 held between plates 69. The plates 69 may be threaded or otherwise secured to the ram 65. The packing member 68 has a peripheral flange 70 slidably sealing with the wall of the cylinder 60. A coiled spring 85 is arranged under compression between the forward wall of the cylinder 60 and the piston 69 to return the piston 67 and the ram 65 to their normal positions after actuation. A port 86 is provided in the forward wall of the cylinder 60 to permit the free forward actuation of the piston 67 in the cylinder.

The piston 67 is actuated by fluid under pressure and the unit 14ª includes valve means for actuating or controlling the piston 67. The web or flange 64 is ported and carries the valve means for governing the piston 67. A longitudinal port 71 is provided in the flange 64 and has a branch port 72 communicating with the rear end of the cylinder 60. A socket 73 is provided in the rear end of the flange 64 and an opening 74 extends forwardly from the socket 73. A fitting 75 is threaded in the socket 73 and is adapted to receive the nipple or fitting 7 of an air supply hose H. A port 71ª connects the port 71 with the inner portion of the socket 73. A normally closed inlet valve 76 is provided in the fitting 75 to control the admission of the fluid or air under pressure to the cylinder 60. The valve 76 may be in the nature of a tire valve of the class employed on the tubes of pneumatic vehicle tires. A rod 79 extends through the opening 74 and the socket 73 and is normally urged forwardly by a spring 78 acting against a flange 77 on the rod.

Means is provided for controlling the valve 76. The means for controlling the valve 76 includes a trigger 80 pivotally supported on a pin 81 at the forward end of the flange 64 to be readily engageable by a finger of the operator's hand grasping the handle 61. The trigger 80 cooperates with the forward end of the stem 79. When the trigger 80 is depressed the rod 79 is shifted inwardly to open the valve 76 to admit air under pressure to the rear end of the cylinder 60.

A discharge valve 82 is provided at the forward end of the port 71. The discharge valve 82 may be of the same type as the valve 76. A finger 83 is provided on the trigger 80 and is adapted to cooperate with the stem of the valve 82. The valve 82 and the finger 83 are related so that the valve 82 is held in its open position when the trigger 80 is in its normal unactuated position. The spring 78 operates to urge the stem 79 forwardly and thus hold the trigger 80 in its normal position where the valve 82 is maintained open. A packing gland 84 may be provided at the forward end of the opening 74 to seal about the stem 79.

Assuming that the container 10 has been supplied with a charge of the desired lubricant in the manner described above, and that the unit 14ª is secured to the container 10, as illustrated in Figs. 2 and 6 of the drawings, the device operates as follows: The operator may readily manipulate the gun and place the discharge fitting 29 against the desired grease receiving fitting preparatory to forcing lubricant thereto. The trigger 80 may then be depressed to admit air under pressure to the rear end of the cylinder 60. The air under pressure admitted to the rear end of the cylinder 60 forces the piston 67 forwardly and moves the ram 65 forwardly into the cylinder 12. The valve 82 closes simultaneously with the opening of the valve 76 so that the air under pressure admitted to the cylinder 60 is effective in actuating the ram 65. Forward movement of the ram 65 in the cylinder 12 forces a charge of lubricant under pressure from the cylinder into the discharge tube 11. When the operator relieves the pressure on the trigger 80 the spring 78 returns the trigger to its normal position allowing the valve 76 to close and effecting opening of the valve 82 whereupon the spring 85 returns the piston to its original position. The ram 65 moves rearwardly with the piston 67 and evacuates the cylinder 12 allowing a charge of lubricant to be forced through the ports 40 into the cylinder. The above described operation may be repeated to effect the ejection of the desired quantity of lubricant under pressure to the grease receiving fitting.

Fig. 5 of the drawings illustrates a container unit or assembly in which the follower 13ª is spring loaded or spring urged. In this assembly the container section 15, the cap 17, the cylinder 12 and the guide 36 may be identical with the corresponding parts of the container assembly illustrated in Figs. 1, 2, and 3 of the drawings. A cap 16ª closes the forward end of the container section 15. In accordance with the invention the cap 16ª is extended or tapered forwardly so that its interior forms a continuation of the interior of the section 15. A central opening 27ª is provided in the outer end of the cap 16ª. The cap 16ª may be provided with a flange 85 threaded onto the forward end of the container section 15.

The spring loaded container assembly illustrated in Fig. 5 of the drawings includes a discharge tube 11ª corresponding in function and location to the discharge tube 11 described above. The tube 11ª extends longitudinally in the container to project forwardly through the opening 27ª in the cap 16ª. The forward projecting end of the discharge tube 11ª may carry suitable means for conveying the lubricant and for cooperating with the grease receiving fittings. In accordance with the invention the tube 11ª is removably or releasably secured in the cap 16ª to be normally fixed or rigid with respect to the container. A collar 25ª is fixed to the tube 11ª. In the particular case illustrated the collar 25ª is fixed to the tube 11ª by a pin 86. A shoulder 87 is provided in the opening 27ª and a nut 20ª is threaded in the opening 27ª to clamp the collar 25ª against the shoulder 87 and thus hold the tube 11ª rigid with the container. The cylinder 12 may be secured to the rear end of the tube 11ª in the same manner as in the previously described form of container assembly and a discharge valve 31 is provided at the forward end of the cylinder.

The follower 13ª is operable in the container section 15 to urge or feed the lubricant to the cylinder 12. The follower 13ª may include two packing elements or members 88 in abutting relation and surrounding the tube 11ª. Plates 89 are provided to clamp the members 88 together. Peripheral sealing flanges 90 are provided on the members 88 to seal with the interior of the container section 15. The flange 90 of the forward member 88 projects forwardly to seal with the internal wall of the section 15 when the follower 13 is moved forwardly. The flange 90 of the rear member 88 slidably seals with the internal wall of the section 15 when the follower is moved rearwardly against the body of lubricant in the container. Flanges 91 are provided on the members 88 to slidably seal about the discharge tube 11ª. The inner portions of the plates 89 are bowed outwardly to permit the proper sealing action of the flanges 91.

Spring means is provided to urge the follower 13ª rearwardly against the body of lubricant in the container section 15. A coiled spring 92 surrounds the discharge tube 11ª and has one end bearing on the collar 25ª and one end bearing on the forward plate 89. The spring 92 is of sufficient strength and length to urge the follower 13ª against the body of lubricant in the container throughout the entire stroke of the follower. The flange 30 on the cylinder 12 limits the rearward travel of the follower 13ª stopping the follower in the rear end part of the section 15. The invention provides a yielding stop for limiting the forward travel of the follower 13ª when lubricant is being loaded in the container. A coiled or spiralled spring 93 is secured to or arranged against a shoulder 94 on the interior of the cap 16ª and surrounds the discharge tube 11ª. The spring 93 normally projects some distance rearwardly into the section 15 and is operable to stop the forward movement of the follower 13ª at or adjacent the forward end of the section 15. A port or vent 94ª is provided in the cap 16ª to place the interior of the cap and the forward portion of the container section 15 in communication with the atmosphere.

The container assembly illustrated in Fig. 5 of the drawings may be employed with or provided with the ram unit 14, the ram unit 14ª or the ram unit 14ᵇ as desired or found necessary. The operation of the spring loaded container assembly with any of these ram units is substantially the same. In operation, the spring 92 urges the follower 13ª rearwardly against the lubricant in the container section 15 so that a charge of lubricant is fed to the cylinder 12 during each return stroke of the ram. It is to be particularly noted that substantially the entire container section 15 may store or contain lubricant. The forward cap 16ª is operable to house the spring 92 in its collapsed or compressed condition so that the section 15 may be substantially filled with the lubricant to provide for prolonged operation of the gun without reloading.

The follower 13a and the discharge tube 11a may be employed to load lubricant in the container section 15. When it is desired to load lubricant in the container section 15 the nut 20a is first unthreaded from the opening 27a to relieve the spring pressure on the follower 13a. The cap 17 which may carry a ram unit is then removed from the rear end of the section 15 and the open rear end of the section is plunged or immersed in the selected lubricant. The discharge tube 11a is then pulled upwardly or outwardly relative to the section 15. The flange 30 engages the rear plate 89 to carry or move the follower 13a with the tube 11a. The follower 13a thus moved outwardly or upwardly through the section 15 draws the lubricant into the lower or rear end of the section. It is to be noted that the spring 92 is drawn forwardly through the opening 27a with the tube 11a and does not need to be compressed during the process of loading lubricant in the assembly. The tube 11a may be drawn outwardly until the outer or forward plate 89 of the follower 13a strikes the spring 93. The spring 93 operates to yieldingly limit the outward or forward movement of the follower 13a, stopping the follower at the forward end of the section 15 when the section 15 has been substantially entirely filled or loaded with lubricant. The cap 17 provided with the desired ram unit is then reapplied to the section 15 and the tube 11a is shifted rearwardly or inwardly until its collar 25a engages the shoulder 87. During this insertion of the tube 11a the spring 93 yields further due to the increased pressure on the lubricant resulting from its displacement by the tube. The spring 93 thus facilitates the assembly of the apparatus during the loading process. The socket 39 of the guide 36 receives, centers and supports the rear portion of the cylinder 12. The nut 20a is then threaded in the opening 27a to hold the tube 11a against movement. The gun is then in condition for operation.

The ram unit 14b illustrated in Fig. 7 of the drawings is in the nature of a manually operable high pressure unit capable of ejecting the lubricant through the discharge tube 11 or 11a at relatively high pressures. The ram unit 14b may be employed on either of the previously described container assemblies. The unit 14b includes a handle 51a, a guide tube 50a, a cylinder liner or bushing 95 and a ram 52a operable in the bushing 95.

The handle 51a and the guide tube 50a may be substantially identical with the handle 51 and the tube 50 of the unit illustrated in Figs. 1 and 3 of the drawings. The tube 50a is shiftably received in a tubular boss 54a on the handle 51a whereby the handle may be reciprocated on the tube. An integral socket part 53a is provided on the forward end of the tube 50a and is adapted to be threaded on the boss 23 to secure the unit 14b to the container assembly.

The cylinder liner or bushing 95 is carried by the guide tube 50 to extend into and reduce the effective diameter of the cylinder 12. The bushing 95 is an elongate tubular part adapted to extend through the guide 36 and cylinder 12 to a point adjacent the discharge valve 31. The internal diameter of the bushing 95 is substantially less than the internal diameter of the cylinder 12. The bushing 95 may have a flange 96 at its rear end threaded in the forward portion of the guide tube 50a. The bushing 95 is thus secured to the tube 50a. Lateral ports 97 are provided in the walls of the bushing 95 to register with the inlet ports 40 of the cylinder 12. Grooves 98 may be provided in the exterior of the bushing 95 to trap the lubricant for sealing between the bushing and the cylinder 12.

The ram 52a is secured to the handle 51a to move therewith and to be reciprocated in the bushing 95 when the handle is operated or reciprocated. The ram 52a extends longitudinally through the guide tube 50a with substantial clearance. The rear portion of the ram 52a may be threaded in a socket or opening 99 in the rear wall of the handle 51a. The forward active portion of the ram 52a is reduced in diameter to properly operate in the bushing 95. A suitable packing member 100 is provided on the rear side of the flange 96 to seal about the ram 52a. A spring 59a surrounds the ram 52a and has one end cooperating with the rear wall of the handle 51a and has its other end cooperating with a threaded nut member 102 which holds the packing member 100 under compression. The spring 59a is operable to return the handle 51a and the ram 52a to their normal positions after forward actuation. Pins 55a in the boss 54a operate in slots 56a in the tube 50a to prevent turning of the handle 51a on the tube 50a and to limit the movement of the handle and ram. When the handle 51a and the ram 52a are in their normal unactuated positions the forward end of the ram 52a is adjacent the ports 97.

The operation of the manually operable ram unit 14b is substantially identical with the operation of the ram unit 14. The handle 51a may be pressed or moved forwardly relative to the container assembly to move the ram 52a forwardly through the bushing 95. The ram 52a moving forwardly through the bushing 95 discharges or ejects a charge of lubricant into the discharge tube 11 or 11a at a relatively high pressure. The spring 59a is operable to return the handle 51a and the ram 52a and upon the return movement of the ram a charge of lubricant is drawn or forced into the bushing 95. It will be apparent how the handle 51a may be reciprocated to effect the discharge of the desired quantity of lubricant from the gun at a relatively high pressure. When the unit 14b is to be applied to the gun the liner or bushing 95 is entered through the guide 36 to be received in the cylinder 12. The guide 36 operates to properly center the bushing 95 so that the socket part 53a may be threaded on the boss 23 to secure the ram unit to the container assembly. When the socket part 53a has been properly threaded on the boss 23 the unit 14b is in condition for operation.

The present invention provides a grease gun embodying a power operated ram unit 14a and low pressure and high pressure manually operable ram units 14 and 14b that may be interchangeably employed on the container and discharge tube assemblies. The ram units may be easily and quickly exchanged without disturbing the other parts of the gun. In exchanging the ram unit on the fluid pressure primed container assembly illustrated in Figs. 1 and 2 of the drawings it is necessary to open the valve 47 before removing the ram unit from the cap 17 so that the lubricant is not discharged through the rear end of the gun. Before removing a ram unit from the spring loaded assembly illustrated in Fig. 5 of the drawings it is necessary to unthread the nut 20a and thus relieve the spring pressure on the follower 13ᵃ so that the lubricant is not forced through the rear end of the gun upon removal of the ram unit. The guide 36 operates to center and align the rams with the cylinder 12 and locate the ram units so that they may be easily and properly applied to the container assembly.

Having described only typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. In a grease gun the combination of, a container for lubricant, means closing the forward end of the container, a discharge tube secured to said means and extending rearwardly in the container, a cylinder at the rear end of the discharge tube, a check valve controlling communication between the cylinder and the container, a rear cap closing the rear end of the container, and a ram unit secured to the rear cap and including a ram operable in the cylinder.

2. In a grease gun the combination of, a container for lubricant, means closing the forward end of the container, a discharge tube secured to said means and extending rearwardly in the container, a cylinder at the rear end of the discharge tube, a valve controlling communication between the cylinder and the discharge tube, a rear cap closing the rear end of the container, an ejector unit on the cap including a reciprocable ram unit, and a guide at the cap for guiding the cylinder to receive the ram.

3. In a grease gun the combination of, a container for lubricant, means closing the forward end of the container, a discharge tube secured to said means and extending rearwardly in the container, a valved cylinder at the rear end of the discharge tube, a cap closing the rear end of the container, an ejector unit carried by the cap and including a reciprocable ram, and a guide on the rear cap ported to admit lubricant to the cylinder and centering the cylinder to receive the ram.

4. In a grease gun, the combination of, a container for lubricant, a discharge tube extending rearwardly in the container, a valved cylinder on the rear end of the discharge tube, means forcing lubricant from the container into the cylinder at super-atmospheric pressure, an ejector unit on the rear end of the container including a ram for ejecting lubricant from the cylinder, and a guide receiving the rear portion of the cylinder and operable to center the ram of said unit for operation in the cylinder.

5. A lubricant gun including, a lubricant container, a lubricant discharge tube extending rearwardly in the container from its forward end, a valved cylinder on the rear end of the tube, a ram unit on the rear end of the container including a ram for operating in the cylinder, and a guide in the container maintaining a coaxial relationship between the ram and the cylinder, and having a port for admitting lubricant from the container to the cylinder.

6. A lubricant gun including, a lubricant container, a lubricant discharge tube extending rearwardly in the container from its forward end, a valved cylinder on the rear end of the tube, a follower in the container acting rearwardly against the lubricant therein, a ram unit on the rear end of the container including a ram for operating in the cylinder, and a guide in the container centering the cylinder to receive the ram and having a port for admitting lubricant from the container to the cylinder.

7. A lubricant gun comprising, a lubricant container, a lubricant discharge tube entering an end of the container, releasable means holding the tube against movement relative to the container, a cylinder on the inner end of the tube, a follower operable in the container on the tube to feed lubricant to the cylinder, ejector means for ejecting the lubricant from the cylinder, and means limiting travel of the follower on the tube whereby the tube may be released from the container and drawn outwardly to cause the follower to draw a supply of lubricant into the container.

8. A lubricant gun comprising, a lubricant container, a lubricant discharge tube entering an end of the container, releasable means holding the tube against movement relative to the container, a cylinder on the inner end of the tube, a follower operable in the container on the tube to feed lubricant to the cylinder, a spring on the tube for urging the follower against the lubricant in the container, a ram for ejecting lubricant from the cylinder, and means causing the follower to move with the tube when the first named means is released and the tube is moved outwardly to draw a supply of lubricant into the container.

9. A lubricant gun comprising, a lubricant container, a lubricant discharge tube entering an end of the container, releasable means holding the tube against movement relative to the container, a cylinder on the inner end of the tube, a follower operable in the container on the tube to feed lubricant to the cylinder, a ram for ejecting lubricant from the cylinder, means limiting travel of the follower on the tube whereby the tube may be released from the container and drawn outwardly to cause the follower to draw a supply of lubricant into the container, and a spring in the forward portion of the container limiting the forward travel of the follower.

10. A lubricant gun comprising, a lubricant container, a lubricant discharge tube entering an end of the container, releasable means holding the tube against movement relative to the container, a cylinder on the inner end of the tube, a follower operable in the container on the tube to feed lubricant to the cylinder, a spring bearing against the follower and a part on the tube to urge the follower against the lubricant in the container, a ram for ejecting lubricant from the cylinder through the tube and a part on the tube cooperable with the follower to move the same forwardly when said means is released and the tube is moved forwardly.

11. A lubricant gun including, a lubricant container having forward and rear caps, a discharge tube extending through the forward cap, means releasably securing the tube to the forward cap, a cylinder at the inner end of the tube, a follower operable in the container to feed lubricant to the cylinder, a spring surrounding the tube and bearing rearwardly against the follower, a part on the tube forming an abutment for the forward end of the spring, a part on the tube limiting the rearward travel of the follower, the spring being movable through the forward cap with the tube when the tube is moved forwardly to cause the follower to draw a charge of lubricant into the container, and a plunger operable in the cylinder to eject lubricant through the tube.

12. A lubricant gun including, a lubricant container having forward and rear caps, a discharge tube extending through the forward cap, means releasably securing the tube to the forward cap, a cylinder at the inner end of the tube, a follower operable in the container to feed lubricant to the cylinder, a spring surrounding the tube and bearing rearwardly against the follower, a part on the tube forming an abutment for the forward end of the spring, a part on the tube limiting the rearward travel of the follower, the spring being movable through the forward cap with the tube when the tube is moved forwardly to cause the follower to draw a charge of lubricant into the container, and a ram unit removably arranged on the rear cap and including a ram operable in the cylinder.

13. A lubricant gun including, a lubricant container having forward and rear caps, a discharge tube extending through the forward cap, means releasably securing the tube to the forward cap, a cylinder at the inner end of the tube, a follower operable in the container to feed the lubricant to the cylinder, a pressure resisting valve controlling communication between the cylinder and the discharge tube, a unit secured to the rear cap and including, a ram operable in the cylinder, and cylinder and piston means operating the ram.

14. A lubricant gun including, a lubricant container having forward and rear caps, a discharge tube extending through the forward cap, means releasably securing the tube to the forward cap, a cylinder on the inner end of the tube, a pressure resisting valve controlling communication between the cylinder and the discharge tube, a guide on the rear cap centering the cylinder and ported to admit lubricant to the cylinder, and a ram unit removably secured to the rear cap including a ram operable in the cylinder to eject lubricant through the tube, and means for operating the ram.

15. A lubricant gun including, a lubricant container having forward and rear caps, a discharge tube extending through the forward cap, means releasably securing the tube to the forward cap, a valved cylinder on the inner end of the tube, a ported guide on the rear cap for admitting lubricant to the cylinder, and a ram unit removably secured to the rear cap including a ram centered by the guide and operable in the cylinder to eject lubricant through the tube, and means for operating the ram, the last mentioned means including a cylinder and piston means, and a valved control for the cylinder and piston means.

16. A lubricant gun including, a lubricant container having forward and rear caps, a discharge tube extending through the forward cap, means releasably securing the tube to the forward cap, a valved cylinder on the inner end of the tube, a ported guide for the cylinder on the rear cap admitting lubricant to the cylinder, and a ram unit removably secured to the rear cap including a guide part, a handle reciprocable on the said guide part, and a ram carried by the handle, centered by said guide part and operable in the cylinder to eject lubricant through the tube.

17. A lubricant gun including, a lubricant container, a discharge tube stationarily secured to the container to extend rearwardly therein and extending from its forward end, a cylinder at the rear end of the container, a valve controlling communication between the cylinder and the discharge tube, and a unit removably secured to the rear end of the container comprising, a guide part, a handle reciprocable on the guide part, and a ram carried by the handle and operable in the cylinder.

18. A lubricant gun including, a lubricant container, a discharge tube secured to the container and extending from its forward end, a cylinder at the rear end of the container having valved communication with the discharge tube, and a unit removably secured to the rear end of the container comprising, a body, a fluid pressure actuated piston operable in the body, and a ram extending into the cylinder and operable by the piston.

19. A lubricant gun including, a lubricant container, a discharge tube secured to the container and extending from its forward end, a cylinder at the rear end of the container having valved communication with the discharge tube, and a unit removably secured to the rear end of the container comprising, a body, a fluid pressure actuated piston operable in the body, a handle on the body, valve means controlling the piston, and a ram extending into the cylinder and operable by the piston.

20. A lubricant gun including, a lubricant container, a discharge tube secured to the container and extending from its forward end, a cylinder at the rear end of the container having valved communication with the discharge tube, and a removable unit on the rear end of the container including, a bushing lining the cylinder, a part reciprocable relative to the bushing, and a ram on said part operable in the bushing to eject lubricant through the tube.

21. A lubricant gun including, a lubricant container, a discharge tube secured to the container and extending rearwardly therein to adjacent its rear end, a cylinder at the rear end of the container, means feeding lubricant from the container to the cylinder, a valve controlling communication between the cylinder and the discharge tube, a guide part on the container, a bushing on the guide part lining the cylinder, a handle reciprocable on the guide part, and a ram on the handle operable in the bushing to eject lubricant through the tube.

22. A lubricant gun including, a lubricant container having forward and rear caps, a discharge tube extending through the forward cap to adjacent the rear cap, means rigidly securing the tube to the forward cap, a valved cylinder on the inner end of the tube, a ported guide on the rear cap for admitting lubricant to the cylinder, and a ram unit removably secured to the rear cap including, a guide part on the container, a bushing on the guide part lining the cylinder, a handle reciprocable on the guide part, and a ram on the handle operable in the bushing to eject lubricant through the tube.

23. A lubricant gun including, a lubricant container, a lubricant discharge tube entering the container, releasable means holding the tube against movement relative to the container, a cylinder on the inner end of the tube, a follower operable in the container on the tube to feed lubricant to the cylinder, means for admitting air under pressure to the container to actuate the follower, a ram for ejecting lubricant from the cylinder, and means for causing the follower to move with the tube when the first named means is released and the tube is moved outwardly to draw a supply of lubricant into the container.

CARL W. STOLL.